S. LITTLE.
WAGON.
APPLICATION FILED APR. 6, 1911.
1,012,666.
Patented Dec. 26, 1911.
2 SHEETS—SHEET 2.
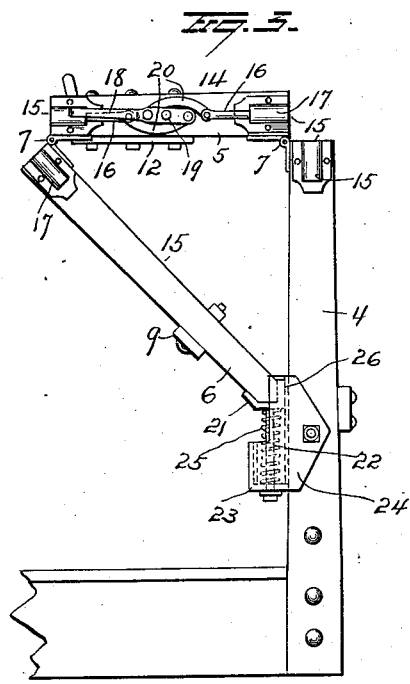
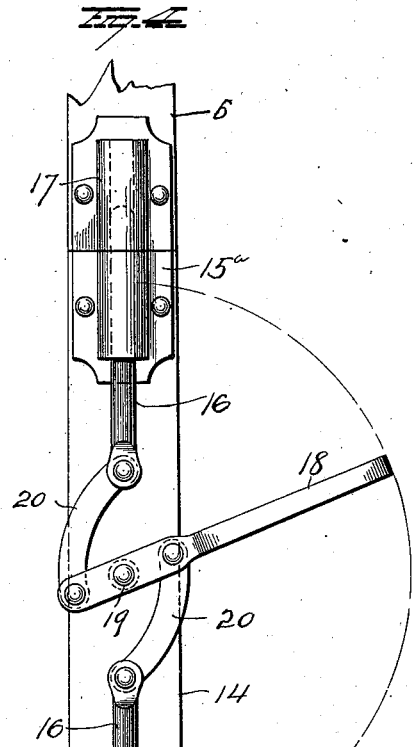
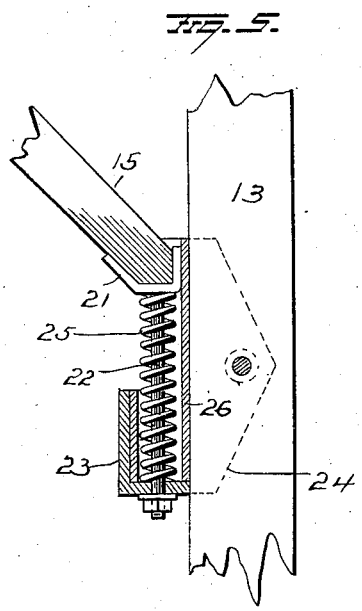
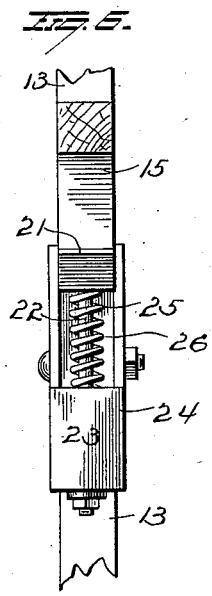
WITNESSES
INVENTOR
S. Little
By H.A. Seymour
Attorneys
COLUMBIA PLANOGRAPH CO., WASHINGTON, D. C.

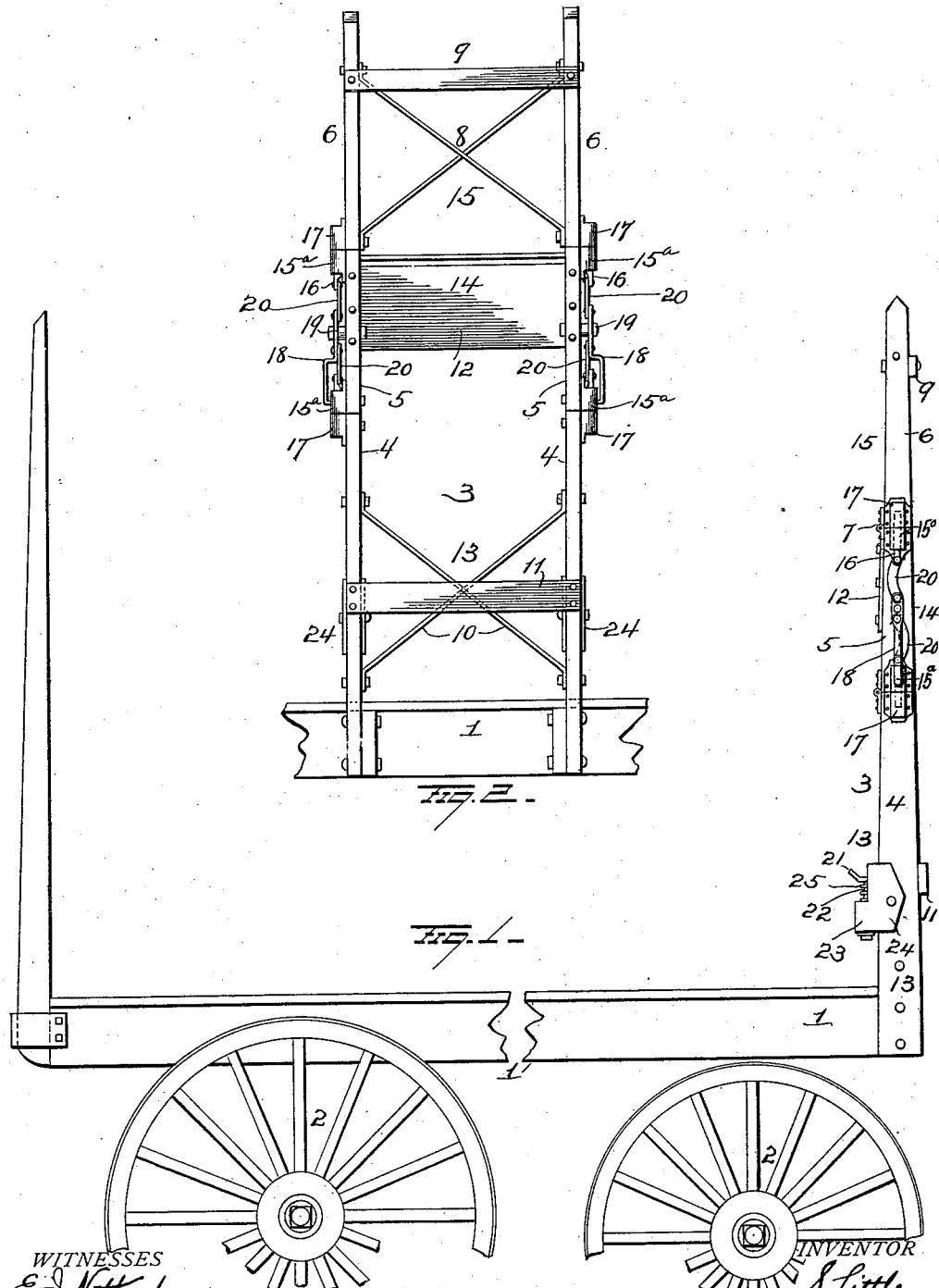

UNITED STATES PATENT OFFICE.

SANTFORD LITTLE, OF FAIRMONT, INDIANA.

WAGON.

1,012,666.   Specification of Letters Patent.   Patented Dec. 26, 1911.

Application filed April 6, 1911. Serial No. 619,433.

*To all whom it may concern:*

Be it known that I, SANTFORD LITTLE, of Fairmont, in the county of Grant and State of Indiana, have invented certain new and useful Improvements in Wagons; and I do hereby declare the following to be a full, clear, and exact description of the invention, such as will enable others skilled in the art to which it appertains to make and use the same.

This invention relates to improvements in wagons, such as employed for hauling hay, straw, fodder and similar material, the object of the invention being to provide simple and efficient means for converting a portion of the rack of such a wagon, into a driver's seat.

A further object is to provide a simple structure in the rack of a wagon of the character specified, whereby a portion of the rack will be normally locked in position to form a vertical end member, and so that said portion of the rack can be readily collapsed and converted into a spring seat.

A further object is to provide a structure of the character specified, which can be operated without the necessity for the aid of numerous assistants.

With these and other objects in view, the invention consists in certain novel features of construction and combinations of parts as hereinafter set forth and pointed out in the claims.

In the accompanying drawings, Figure 1 is a side elevation showing a hay wagon embodying my improvements. Fig. 2 is an end view illustrating the improved structure. Fig. 3 is a side elevation showing the end rack member collapsed and forming a driver's seat. Fig. 4 is an enlarged view showing the locking devices for the sections of the collapsible end member, and Figs. 5 and 6 are detailed views showing the spring mounting for the seat.

1 represents the bed constituting the bottom of the rack of a hay wagon, and 2 the wheels of the wagon, on the axles of which the bed 1 is supported in any suitable manner.

At one end of the bed 1 (the forward end) the rack includes a frame 3. This frame comprises two uprights, each consisting of bars 4, 5 and 6 hinged together as shown at 7. The upper bars 6 are connected together by diagonal braces 8 and a horizontal cross-bar 9. The lower bars 4 are similarly connected together by diagonal braces 10 and a cross-bar 11. The intermediate bars 5 of the respective uprights are connected together by a board or broad member 12 which, when the frame 3 is collapsed and disposed in the position shown in Fig. 3, constitutes the horizontal member of a seat. It will be observed that the upright frame 3 thus comprises a lower member 13 which is secured to the wagon bed; a superimposed or intermediate member 14 hinged to the member 13, and an upper member 15 hinged to the intermediate member 14. When the three members composing the frame 3 are disposed in vertical alinement with each other, said frame constitutes a portion of the end of the rack. It is desirable that the members composing this collapsible frame or upright, shall be normally locked in upright or working position and that the said members can be readily unlocked and the frame collapsed so that it can be disposed as shown in Fig. 3 to form a driver's seat. For such purpose, the devices now to be described will be employed.

Locking devices will be provided (preferably) at both sides of the collapsible frame, but as both sets of said locking devices are identical in construction and mode of operation, a detailed description of one set will suffice for both. Secured to the respective end portions of intermediate bar 5 are guide brackets 15ª for the accommodation of sliding bolts 16 and the adjacent ends of the bars 4 and 6 have secured thereto, keepers 17 for the reception of said bolts. A lever 18 is pivotally mounted at a point between its ends, as at 19, to the intermediate bar 5 centrally between the guide brackets 15ª thereon. Links 20 are pivotally attached to the lever 18 at respective sides of the pivotal support of the latter and these links are pivotally attached at their other ends to the bolts 16—16 respectively. The links 20 are preferably curved so that when the lever 18 is moved to a position substantially parallel with the bolts 16, said links will embrace or be disposed at respective sides of the pivotal mounting of the lever on the bar 5. When the lever 18 is moved upwardly from the position shown in Fig. 4, the bolts 16 will be withdrawn from their keepers 17 and the frame 3 can then be collapsed or folded back and the members composing said frame made to assume the positions shown in Fig 3. The upper member 15 of the frame now becomes a brace or support for the intermediate member which constitutes the seat. The free lower end of the frame member 15, which is now disposed in a diagonal position, is seated in a socket or bracket 21 secured to the upper end of a bolt 22,—the lower end of said bolt passing freely through the bottom of a socket 23 formed on a bracket 24 secured to the lower frame bar 4. A spring 25 encircles the bolt 22 and bears at its upper end against the socket or bracket 21, the lower portion of said spring entering and being seated in the bottom of the socket 23 of bracket 24. When the parts are thus disposed, a spring seat will be provided. In order to permit free vertical movement of the socket piece 21 and prevent undue wear against the frame bar 4, I provide a wear plate 26 within the bracket 24 and against the face of said bar 4.

It will be apparent that when it is desired to shift the parts of the device from the positions shown in Fig. 3 to the upright position shown in Fig. 2, this can be readily done by a single person and when the frame members shall have become disposed in vertical alinement, the operator can, by moving the levers 18, throw the bolts 16 into their keepers 17 and thus the members will be locked in vertical alinement and the frame constitute a rigid portion of the rack.

Having fully described my invention what I claim as new and desire to secure by Letters-Patent, is,—

1. A convertible frame constituting an end portion of a traveling rack, said frame comprising a plurality of members hinged together, means carried by an intermediate frame member and engaging the other frame members for locking all of said frame members in vertical alinement, and hand operated means for operating the locking means, said intermediate frame member constituting a seat and the free end member constituting a prop when the frame is collapsed.

2. A frame comprising a plurality of members hinged together, means carried by an intermediate frame member and engaging the other frame members to normally lock all of said frame members in vertical alinement, means carried by the intermediate frame member for operating the locking means, and means on the lower frame member to receive the free end of the top frame member and support the intermediate frame member in a horizontal position to form a seat.

3. A frame adapted to constitute a portion of a rack, said frame comprising a plurality of members hinged together, sliding bolts mounted on an intermediate frame member, keepers on the end frame members to receive said bolts, and lock all of said frame members in vertical alinement, a lever pivoted to the intermediate frame member, and links connecting said lever with the bolts, the top end member constituting a prop for sustaining the intermediate frame member in a horizontal position to form a seat when the frame is collapsed.

4. A collapsible frame comprising a plurality of members hinged together, means for locking said members in vertical alinement whereby said frame will constitute a portion of a rack, means for operating said locking means, and spring bearings supported by one end member of the frame and adapted to receive the free end of the other end member of said frame and support an intermediate member of the frame in position to constitute a driver's seat.

5. A rack member comprising a fixed frame member and two hinged frame members, means for normally locking said frame members together in alinement with each other, the intermediate hinged frame member being adapted when in a horizontal position to constitute a seat, and means for supporting the free end of the upper frame member against the fixed frame member to constitute a brace for the seat.

In testimony whereof, I have signed this specification in the presence of two subscribing witnesses.

SANTFORD LITTLE.

Witnesses:
FRANK HOWARD,
GEO. S. GRUBB.

---

Copies of this patent may be obtained for five cents each, by addressing the "Commissioner of Patents, Washington, D. C."